United States Patent
Bekedam

[19]

[11] Patent Number: 6,079,372
[45] Date of Patent: Jun. 27, 2000

[54] TRIPLE EFFECT, PRESSURIZED DEAERATION SYSTEM FOR BOILERS

[76] Inventor: Martin Bekedam, 19059 N. 88th Ave., Westbrook Village, Peoria, Ariz. 85382

[21] Appl. No.: 09/181,702

[22] Filed: Oct. 28, 1998

[51] Int. Cl.[7] ...................................................... F22D 5/26
[52] U.S. Cl. .......................... 122/451 R; 96/204; 96/219; 96/220
[58] Field of Search ................................ 122/451 R, 452; 96/204, 219, 220

[56] References Cited

U.S. PATENT DOCUMENTS

| | | | |
|---|---|---|---|
| 4,698,076 | 10/1987 | Bekedam | 55/164 |
| 4,874,406 | 10/1989 | Bekedam | 55/198 |
| 5,310,417 | 5/1994 | Bekedam | 96/157 |
| 5,405,435 | 4/1995 | Bekedam | 95/158 |
| 5,728,200 | 3/1998 | Bekedam | 96/158 |

*Primary Examiner*—Denise L. Ferensic
*Assistant Examiner*—Jiping Lu
*Attorney, Agent, or Firm*—Richard Esty Peterson

[57] ABSTRACT

A triple effect, pressurized deaeration system for boiler feedwater the system including a component deaerator unit and a feedwater receiver, the deaerator unit being mounted external to and above the feedwater receiver, the deaerator unit including a makeup and return water spray nozzle and a pair of screen trays with steam circulated from the receiver through the screen trays and water spray for two stages of deaeration with spray water collected below the screens and delivered through a spray water return conduit to a water collection and mixing column in the receiver, wherein steam from a steam supply is delivered to the water collection column and mixed with collected spray water for a third stage deaeration before the deaerated water commingles with reservoir water contained in the receiver.

10 Claims, 2 Drawing Sheets

TRIPLE EFFECT, PRESSURIZED DEAERATION SYSTEM FOR BOILERS

BACKGROUND OF THE INVENTION

This invention relates to a boiler feedwater system and includes a component deaerator unit similar to the compact deaerator unit of my U.S. Pat. No. 5,728,200, issued Mar. 17, 1998, entitled, "Compact Deaerator Unit and Feedwater System." In particular, the subject invention relates to a horizontally disposed deaerator unit connected to a modified feedwater receiver.

The subject feedwater deaeration system is designed as an inexpensive and efficient combination to achieve a triple effect deaeration in a pressurized system that stores a supply of deaerated feedwater for a boiler system.

A typical boiler feedwater receiver comprises a tank holding a supply of deaerated water on demand for a boiler system. Untreated water contains gases and salts that are corrosive to components of the boiler system, particularly boiler pipes in a boiler unit. The boiler pipes are expensive to replace and replacement causes shut-down of the system. In addition to chemical treatment to remove corrosive salts, water is thermally treated to purge the water of gases including oxygen and carbon dioxide which cause corrosion and scaling by oxidation and carbonation of the system components. In typical prior art systems, the water in the feedwater receiver is heated to just under the boiling point to drive gases from the water. Gases are vented through an open vent or a constricted pressure release vent on displacement by steam and water vapor used to heat the water in the receiver.

This invention relates to an inexpensive external component that provides substantial improvements to a standard feedwater receiver to minimize loss of steam and maximize the deaeration of receiver water. State-of-the-art improvements in the design of feedwater receivers are disclosed in my patents for "Jet Spray Atmospheric Deaerator," U.S. Pat. No. 4,874,406 issued Oct. 17, 1989, and "Atmospheric Deaerator," U.S. Pat. No. 5,310,417, issued May 10, 1994. Similar improvements result in outfitting standard, single compartment, pressurized feedwater receivers with the compact external component of the deaerator unit of this invention with only minor modification of the receivers.

In a pressurized deaeration system where a pressure of approximately 5 p.s.i. is maintained, water can be elevated to 226–227° F. before boiling. The elevated temperature has greater effect in driving noncondensible gases from the feedwater. To prolong the life of the feedwater receiver, it is desirable to accomplish the primary deaeration of the feedwater in a separate unit at the point in the feedwater circuit where the water is most contaminated. The smaller component deaerator unit can then be constructed of corrosive resistant materials such as stainless steel that is cost-effective in a feedwater system that otherwise utilizes standard components. Improved deaeration can be achieved by increasing the dwell time for steam contact of return water and makeup water before the water commingles with the reservoir water stored in the receiver. One method of increasing contact time is the effective use of spray water collection trays to improve deaeration of the spray water before commingling with the reserve water of the receiver reservoir.

The use of a typical spray water collection tray in a deaeration system is described in the above referenced U.S. Pat. No. 4,874,406 and in my earlier U.S. Pat. No. 4,698,076 issued Oct. 6, 1987, entitled "Atmospheric Deaerator Unit."

The strategic placement of a spray water collection tray can improve the deaeration of circulated water, particularly when circulated water is mixed with makeup water that may be pre-treated, but is customarily high in noncondensible gases.

The newly invented system incorporates a series of inexpensive collection trays in a component deaerator unit and strategically locates the trays in the path of steam flow that migrates toward a constricted vent in the unit. The collection trays are in the form of horizontal screens. The screen trays are also in the path of the falling spray water from the boiler water return line and the makeup water line.

In addition, a standard feedwater receiver is modified to include a steam supply in the receiver that has a swirling steam discharge located within a spray water collection column to turbulently blast collected spray water from the component unit into the receiver where it mixes with the receiver reservoir water. In this manner the steam has a third opportunity to contact and heat the circulated water before the thoroughly deaerated water combines with the stored water in the receiver, ready for pumping to the boiler.

SUMMARY OF THE INVENTION

This invention relates to a feedwater deaeration system for a boiler and includes a component deaerator unit in combination with a modified feedwater receiver. The component deaerator unit of this invention has two deaeration stages and is designed to operate in combination with a conventional boiler feedwater receiver that is modified to include a third deaeration stage, thereby producing a triple effect, pressurized deaeration system.

The component deaerator unit is a compact vessel that in a preferred embodiment is advantageously fabricated from welded stainless steel pipe fittings to form a chamber containing a feedwater spray and multiple screen trays for the first and second stages of the triple stage deaeration process. The component deaerator unit is mounted over and connected to the feedwater receiver to provide passage of steam from the feedwater receiver to the component deaerator unit and gravity passage of the spray water from the deaerator unit to the receiver. The spray water is a mixture of the cycled boiler feedwater as a return condensate, and any makeup water from a water supply. Both sources usually contain non-condensible gases which must be purged before the water is again cycled to the boiler.

The component deaerator unit of this system includes a water nozzle for discharging a divergent, full spray of fine droplets into an upper dome portion of an internal chamber in the pressurized vessel. The vessel also has an elongated portion, preferably cylindrical, in which two contact screen trays are mounted for maximizing liquid-gas contact between the falling spray water and the rising scrubbing steam. Gases purged from the water are expelled through a constricted vent at the top of the dome portion of the vessel.

Steam enters from each end of the elongated portion of the vessel and is directed under the screen trays to rise through the screens of the screen trays and commingle with the spray, where steam condenses as the spray is heated purging the non-condensible gases in a first deaeration stage. The falling spray water contacts the screens where it dwells while dripping, and is further purged of gasses by the steam rising through the screens in a second deaeration stage. The falling screen water collects in the bottom of the vessel and drains through a conduit to the feedwater receiver.

In the feedwater receiver the collected spray water is initially isolated from the feedwater reservoir and is delivered in a conduit to a mixing column where the accumulating water is blasted by a turbulent, swirling flow of steam injected into the mixing column.

The swirling mixture of steam and collected screen water provides a tertiary treatment of the cycled water in the volume of the receiver above the level of the stored feedwater. The cycled water, purged of non-condensible gases by the triple effect deaeration process, falls to the surface of the reservoir water in the receiver, where any residual gases have an opportunity for final release before mixing with the receiver water being supplied from the bottom of the receiver to the boiler.

DETAILED DESCRIPTION OF THE PREFERRED EMBODIMENTS

Figure 1:
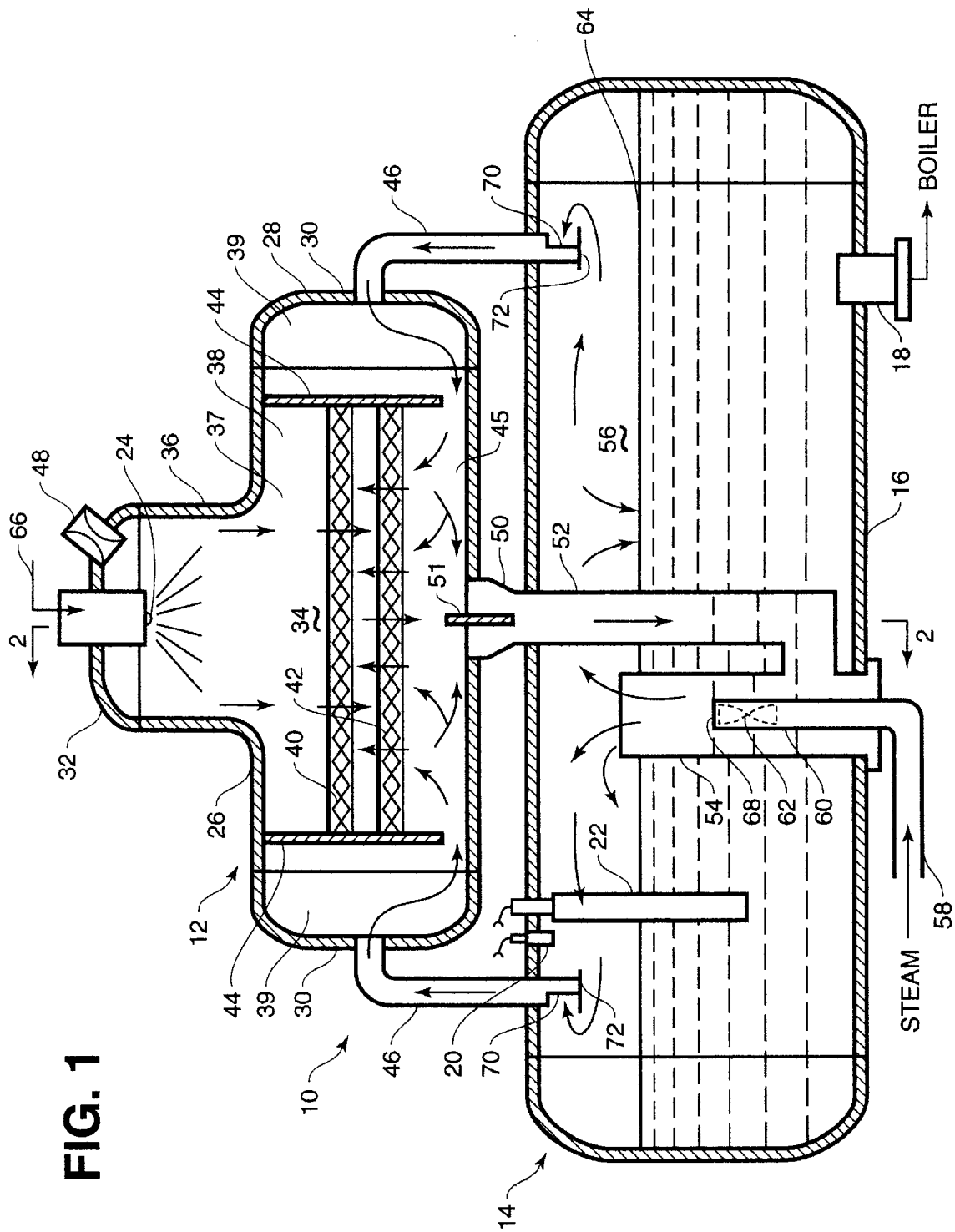
FIG. 1 is a cross sectional, schematic view of the component deaerator unit in combination with a modified feedwater receiver to form a triple-effect, boiler feedwater deaeration system.
Figure 2:
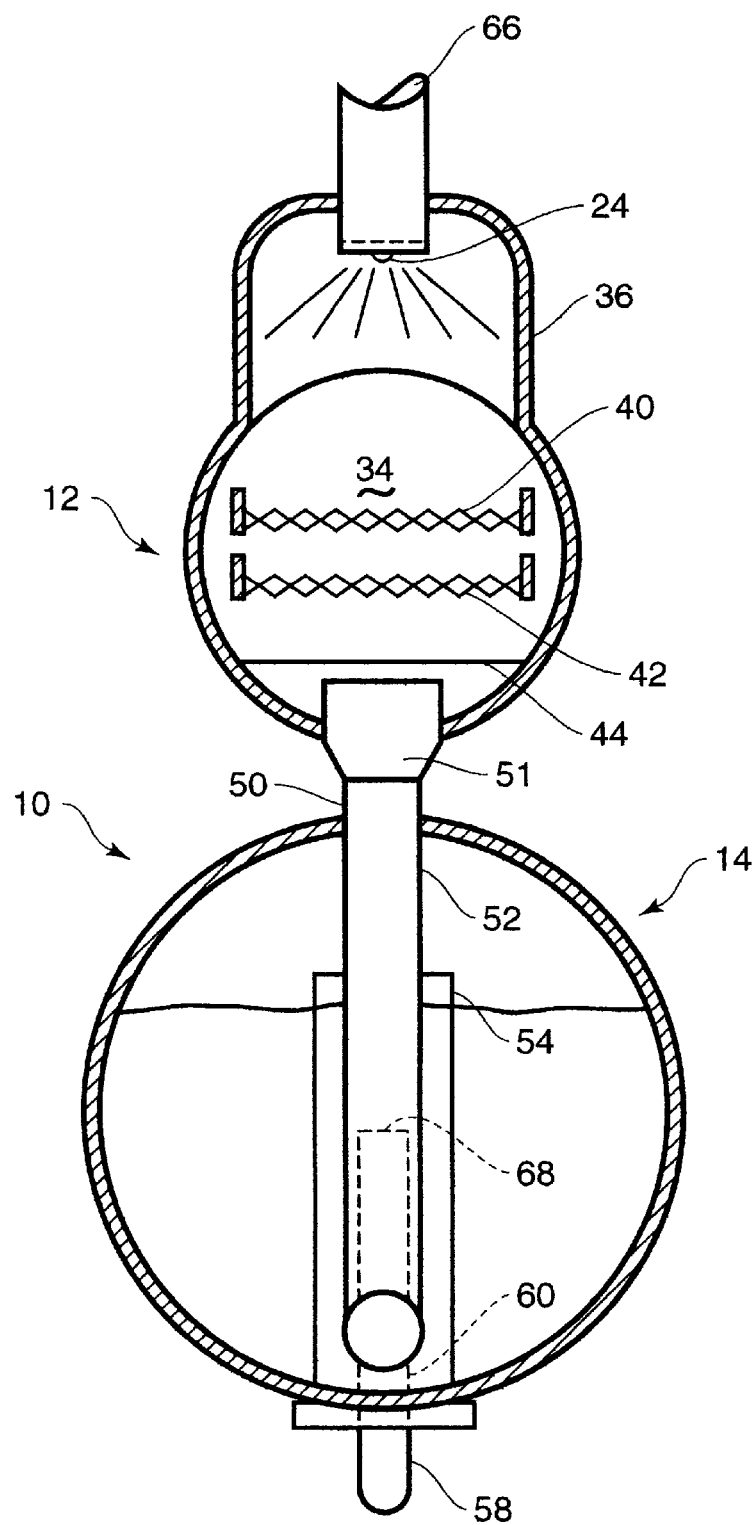
FIG. 2 is a cross sectional schematic view of the system of FIG. 1 taken along the lines 2—2 in FIG. 1.

Referring to FIG. 1, a feedwater deaerator system, designated generally by the reference numeral 10, is shown with a component deaerator unit 12 in combination with a modified feedwater receiver 14. The feedwater receiver 14 is a standard, cylindrical storage tank 16 that supplies a boiler (not shown) with deaerated feedwater drawn through a short stand pipe 18 in the bottom of the receiver 14. The receiver 14 stores a quantity of deaerated water to meet the varying requirements of the boiler during operation. The receiver 14 is equipped with the conventional controls for safe operation including a pressure sensor 20 that aids in regulating a steam supply, and a level control 22 for regulating makeup water supplied to a spray nozzle 24 in the component deaerator unit 12.

The component deaerator unit 12 is a pressurizable vessel 26 preferably fabricated from stainless steel pipe fittings including a tee 28 with welded end caps 30 and top cap 32. The deaerator unit 12 is formed with an internal chamber 34 with an upper dome portion 36 and a lower elongated cylindrical portion 38 with a central part 37 and opposite ends parts 39. The vessel 26 contains a pair of screen trays 40 and 42 supported by headers 44. The screen trays, preferably have diamond shaped holes with screens off-set from one another so holes are not aligned. The headers 44 separate the central part 37 from the end parts 39 and function as baffles with a passage 45 under the headers.

Steam enters the end caps 30 at opposite ends of the elongated portion 38 through steam conduits 46. The steam must therefore pass under the headers 44 before rising up through the screens 42 and 40. Noncondensable gasses resident on or dripping from the screens 40 and 42 are purged by the counter flow of the rising steam. Steam then enters the upper part of the elongated portion 38 of the internal chamber 34 where it heats and drives non-condensible gasses from the fine droplets in the dispersion spray from the spray nozzle 24. The non-condensible gasses are driven to the top part of the upper dome portion 36 of the internal chamber 34 to exit through constricted vent 48.

In this manner, the steam has had two opportunities to purge the makeup water and return water from the boilers that enter the spray nozzle 24 for return to the feedwater deaerator system 10. The deaerated makeup water and boiler return condensate fall to the bottom of the elongated cylindrical portion 38 of the internal chamber 34 and collect in drain 50. The drain 50 has a central baffle 51 that keeps the water from vortexing as it enters the return pipe 52 to return the collected water to the feedwater receiver 14. The return pipe 52 connects to a water collection column 54 where the return water collects until it is blasted into the internal chamber 56 of the receiver by steam from a steam supply line 58. Steam supply is regulated by the pressure sensor 20 that maintains the internal pressure of the system at approximately 5 p.s.i. At this elevated pressure the water can be elevated to approximately 226–227° F. before boiling.

The steam return line 58 includes an internal delivery pipe 60 having a helical guide foil 62 that forms a deflector to twist and spin the discharged steam so that return water accumulating in the water column 54 is turbulently discharged into the chamber 56. In this manner, the steam has a third opportunity to purge the twice deaerated makeup water and return condensate before it commingles with the reservoir water 64 in the receiver 14. The water level control 22 insures that there is a reserve quantity of water without filling the receiver 14 allowing a space for the ejected steam and blasted water to commingle before the thoroughly deaerated water drops to the reservoir water 64. The receiver 14 is sized to provide for variations in the water demands of the boiler (not shown) which draws its water through a short stand pipe 18 at the bottom of the receiver 14. It is to be understood that the makeup and return condensate in line 66 are delivered under pressure to achieve the fine spray in the spray nozzle 24.

From the prospective of steam passage, steam from the boiler enters the receiver through steam conduit 58 and is turbulently discharged through the end 68 of the vertical stand pipe 60. As noted, the steam discharged swirls as a result of the helical foil 62 and blasts overflow water in the water column 54 into the receiver chamber 56. The steam then passes to opposite ends of the receiver 14 to enter openings 70 in the interconnecting steam conduits 46. The openings 70 have an end plate 72 requiring the steam to enter from the far ends of the receiver. The steam, partially reduced in volume from the scrubbing of the collected deaerator water in the water column 54 enters the deaerator unit 12 at opposite ends 30 and passes under the headers 44 to rise up through the screens 42 and 40. The rising steam contacts the descending spray water dripping from the screens and finally enters the dome portion 36 of the deaerator unit 14. Here the steam contacts the entering spray water raising the temperature of the spray water and driving non-condensible gasses from the water while the steam condenses and drops with the preliminarily deaerated spray water to the screens. Gasses that are not condensible are vented through constricted vent 48.

In this operation the super-heated steam that enters the receiver has three opportunities to deaerate the makeup and return water before the water commingles with the reservoir water 64 in the receiver.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A boiler feedwater system having triple-effect deaeration comprising an elongated feedwater receiver having an internal chamber with opposite end portions for storing a supply of deaerated boiler water in a bottom portion of the chamber and having a gas space in a top portion of the chamber;

a component deaerator unit mounted above the feedwater receiver, the deaerator unit having an internal chamber with an upper dome portion and a lower elongated portion, the upper dome portion having a spray nozzle for spray water and a constricted vent above the spray nozzle for releasing noncondensible gases to the atmosphere, and the lower elongated portion having at least one screen tray arranged in the path of spray water, the elongated portion of the chamber having a central part and opposite end parts with a header mounted proximate each end part separating the end parts from the central part, the header having a passage under the header through which the end parts communicate with the central part;

two steam delivery conduits each having a first end connected to one of the end parts of the deaerator unit chamber, a second end connected to one of the end portions of the receiver chamber, wherein the two steam delivery conduits deliver steam from opposite end portions of the receiver chamber to opposite end parts of the deaerator unit chamber;

a spray water return conduit having a first end connected to the deaerator unit with an end opening located under the screen tray, and a second end connected to the receiver, a water collection column in the receiver rising in the bottom portion of the chamber and terminating in the upper portion of the chamber, wherein the second end of the spray water return conduit has an end opening in the water collection column; and, a steam supply conduit connected to a steam supply having a steam discharge end in the water collection column, wherein spray water collected in the collection column is mixed with steam an discharged into the top portion of the receiver chamber before commingling with the supply of deaerated boiler water.

2. The boiler feedwater system of claim 1 wherein the screen tray is mounted to the headers.

3. The boiler feedwater system of claim 1 wherein a plurality of screen trays are positioned under the spray nozzle.

4. The boiler feedwater system of claim 1 wherein the second ends of the two steam delivery conduits are located in the top portion of the receiver chamber wherein the receiver has ends and the second ends of the two steam delivery conduits have openings facing the ends of the receiver.

5. The boiler feedwater system of claim 1 wherein the water collection column has an upper portion and a lower portion and the end opening of the second one of the spray water return conduit opens in the lower portion of the water collection column.

6. The boiler feedwater system of claim 5 wherein the steam discharge end of the steam supply conduit is located in the upper portion of the water collection conduit.

7. The boiler feedwater system of claim 6 wherein the steam discharge end of the steam supply conduit includes a deflector to induce a swirl to discharging steam.

8. The boiler feedwater system of claim 1 wherein the first end of the spray water return conduit connected to the deaerator unit has a drain opening with a baffle to prevent vortexing of draining spray water.

9. The boiler feedwater system of claim 1 wherein the deaerator unit is fabricated from standard pipe fittings.

10. The boiler feedwater system of claim 9 wherein the fittings are stainless steel.

* * * * *